US008834238B2

(12) United States Patent
Ryan

(10) Patent No.: US 8,834,238 B2
(45) Date of Patent: Sep. 16, 2014

(54) FISH PROCESSING SYSTEM AND METHOD

(75) Inventor: Robert M. Ryan, Woodway, WA (US)

(73) Assignee: RYCO Equipment, Inc., Mountlake Terrace, WA (US)

( * ) Notice: Subject to any disclaimer, the term of this patent is extended or adjusted under 35 U.S.C. 154(b) by 367 days.

(21) Appl. No.: 13/357,482

(22) Filed: Jan. 24, 2012

(65) Prior Publication Data
US 2013/0189913 A1 Jul. 25, 2013

(51) Int. Cl.
*A22C 25/00* (2006.01)
(52) U.S. Cl.
USPC .......................................................... 452/170
(58) Field of Classification Search
CPC .... A22C 25/18; A22C 25/142; A22C 17/002; A22C 17/0073; A22C 17/0086; A22C 21/0023; A22C 25/14; A22C 17/0033; A22C 17/008; A22C 17/02; A22C 21/003; A22C 25/08; A22C 25/145; A22C 7/00
USPC .................. 452/149–151, 155–157, 163, 170
See application file for complete search history.

(56) References Cited

U.S. PATENT DOCUMENTS

| | | | | | |
|---|---|---|---|---|---|
| 4,875,254 | A | * | 10/1989 | Rudy et al. | 452/157 |
| 4,962,851 | A | * | 10/1990 | Schuckmann et al. | 222/209 |
| RE33,851 | E | * | 3/1992 | Rudy et al. | 452/150 |
| RE33,904 | E | * | 4/1992 | Rudy et al. | 452/150 |
| 5,163,865 | A | * | 11/1992 | Smith | 452/157 |
| 5,480,347 | A | * | 1/1996 | Hicks | 452/170 |
| 5,618,231 | A | * | 4/1997 | Hicks | 452/177 |
| 5,620,365 | A | * | 4/1997 | Hicks | 452/106 |
| 6,120,369 | A | * | 9/2000 | Eide | 452/149 |
| 7,621,806 | B2 | * | 11/2009 | Bottemiller et al. | 452/150 |
| 7,623,249 | B2 | * | 11/2009 | Sandberg et al. | 356/601 |
| 7,651,388 | B2 | * | 1/2010 | Faires et al. | 452/157 |
| 8,092,283 | B2 | * | 1/2012 | Hansen | 452/121 |

* cited by examiner

*Primary Examiner* — Richard Price, Jr.
(74) *Attorney, Agent, or Firm* — Seed IP Law Group PLLC

(57) ABSTRACT

Methods and systems for processing fish are provided which enable removal of the head or other portion of a fish in a particularly reliable and efficient manner. The systems include a conveyor drive motor which provides continuous movement of a conveyor device for transporting fish along a transport path and which simultaneously provides intermittent movement of a blade across the transport path to sequentially sever a portion of each fish. An intermittent drive mechanism is coupled to the conveyor drive motor and coupled to the blade to convert continuous movement produced by the conveyor drive motor to intermittent movement of the blade between a standby position and a cutting position. Related methods for severing a portion of each fish in a series of transported fish are also provided.

18 Claims, 3 Drawing Sheets

FISH PROCESSING SYSTEM AND METHOD

BACKGROUND

1. Technical Field

This disclosure generally relates to systems and methods for processing fish, and more particularly to systems and methods for severing the head of a fish from its body in a reliable and consistent manner.

2. Description of the Related Art

In some fish products, the head is removed at the gills, leaving a hard cartilage structure on the head end of the fish called the collar. The viscera, including the gonads (roe or milt) are removed, the kidney membrane is cut and the kidney is removed with water sprays and brushes. In the salmon industry, this product is called a head and gut product and is a valuable commodity. An initial step of preparing such head and gut product is the removal or severing of the head from the body of the fish. Various devices for severing the head of the fish are known, including systems which feature a guillotine knife operated with a pneumatic cylinder which is actuated with compressed air to plunge through fish which are transported beneath the knife.

While known systems have been generally effective in fish head removal, the systems may suffer from various deficiencies and shortcomings, such as, for example, inadvertent damage to the fish resulting from mistiming of guillotine knife devices, and the systems may be overly complex and expensive to produce and/or operate.

BRIEF SUMMARY

The systems and methods of processing fish described herein provide for the efficient removal of fish heads in a particularly reliable and robust form factor.

According to one embodiment, a fish processing system may be summarized as including a structural frame; a conveyor device coupled to the structural frame to convey fish received on the conveyor device across a cutting location; a conveyor drive motor coupled to the structural frame and having a drive shaft coupled to the conveyor device to cause the conveyor device to move via continuous rotation of the drive shaft; a blade movably coupled to the structural frame to move across a transport path of the fish conveyed by the conveyor device; and an intermittent drive mechanism coupled to the drive shaft of the conveyor drive motor and drivingly coupled to the blade to convert continuous rotation of the drive shaft to intermittent movement of the blade between a standby position and a cutting position to sequentially sever a portion from each of a series of the fish conveyed across the cutting location during a fish processing operation.

The fish processing system may further include a blade drive wheel and a tractive element, the intermittent drive mechanism drivingly coupled to the blade drive wheel by the tractive element to rotate the blade drive wheel intermittingly during the fish processing operation. The fish processing system may further include a linkage member coupled to the blade and driven by the blade drive wheel to move the blade in a reciprocating manner between the standby position and the cutting position. Blade guide members may be positioned to ensure linear movement of the blade when the blade reciprocates between the standby position and the cutting position.

According to another embodiment, a fish processing apparatus may be summarized as including a conveyor device; a conveyor drive motor coupled to the conveyor device to cause fish received by the conveyor device to be transported along a transport path; a blade movable across the transport path; and an intermittent drive mechanism coupled to the conveyor drive motor and coupled to the blade to convert continuous movement produced by the conveyor drive motor to intermittent movement of the blade between a standby position and a cutting position.

The intermittent drive mechanism may include a Geneva drive. The fish processing apparatus may further include a linkage member coupled to the blade and driven by the intermittent drive mechanism to move the blade in a reciprocating manner between the standby position and the cutting position. The fish processing apparatus may further include a blade drive wheel and a tractive element, the intermittent drive mechanism drivingly coupled to the blade drive wheel by the tractive element to rotate the blade drive wheel intermittingly when processing the fish. The fish processing apparatus may further include blade guide members positioned to ensure linear movement of the blade when the blade reciprocates between the standby position and the cutting position. The fish processing apparatus may further include a controller configured to adjust a speed of the conveyor drive motor to simultaneously regulate a rate at which the fish are transported along the transport path and a frequency at which the blade moves from the standby position to the cutting position. Movement of the blade and movement of the conveyor device may be controlled simultaneously via the conveyor drive motor. The conveyor drive motor may be physically linked to each of the blade and the conveyor device by at least one respective tractive element.

According to another embodiment, a method of processing fish may be summarized as including transporting fish through a cutting location with a conveyor device driven by continuous rotation of a drive shaft of a conveyor motor; and converting the continuous rotation of the drive shaft of the conveyor motor to intermittent movement of a blade to reciprocate the blade between a standby position and a cutting position. The method of processing fish may further include coordinating the intermittent movement of the blade to correspond to the arrival at the cutting location of each fish in a series of the fish.

The method of processing fish may further include simultaneously adjusting a rate at which the fish are transported along the transport path and a frequency at which the blade moves from the standby position to the cutting position. The method of processing fish may further include guiding the blade to reciprocate linearly between the standby position and the cutting position. The method of processing fish may further include driving the blade between the standby position and the cutting position with a linkage member coupled between the blade and a blade drive wheel, the blade drive wheel coupled to the drive shaft of the conveyor motor by an intermittent drive mechanism. The method of processing fish may further include sequentially severing a head from each of a series of the fish transported through the cutting location. Converting the continuous rotation of the drive shaft of the conveyor motor to intermittent movement of the blade may include intermittingly rotating a blade drive wheel via an intermittent drive mechanism coupled between the blade drive wheel and the conveyor motor. The method of processing fish may further include routing the fish to another location downstream of the cutting location for subsequent processing or packaging.

DETAILED DESCRIPTION

In the following description, certain specific details are set forth in order to provide a thorough understanding of various disclosed embodiments. However, one skilled in the relevant art will recognize that embodiments may be practiced without one or more of these specific details. In other instances, well-known structures and techniques associated with fish processing systems and methods may not be shown or described in detail to avoid unnecessarily obscuring descriptions of the embodiments. For instance, well known power transmission components may be provided to transmit power to and drive elements of the various fish processing systems described herein. Drive and control systems may also be provided to selectively control a speed with which components move and thus a rate at which fish are processed.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Figure 1A:
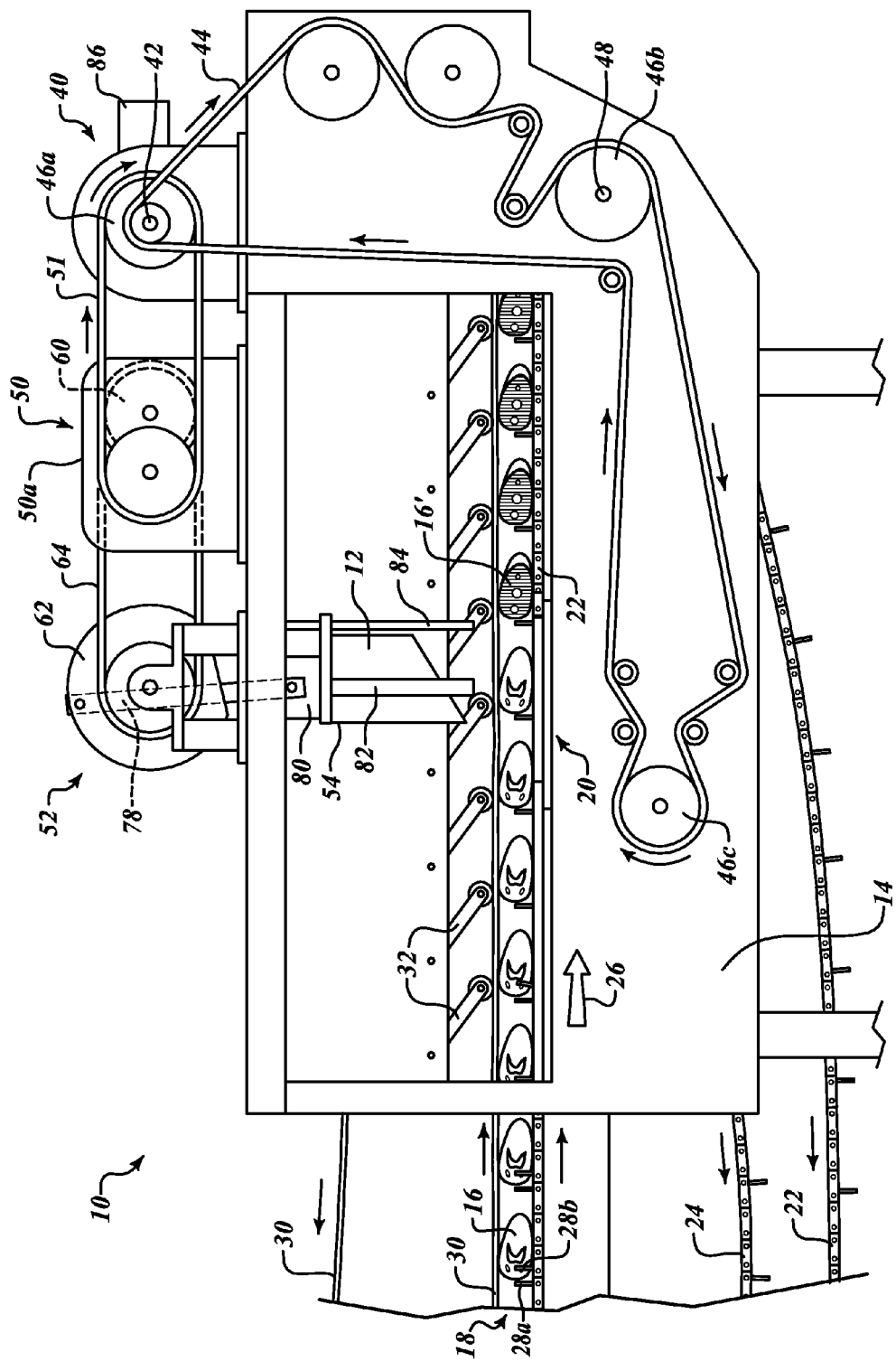
FIG. 1A is a side elevational view of a fish processing system according to one embodiment showing a blade thereof in a standby position.
Figure 1B:
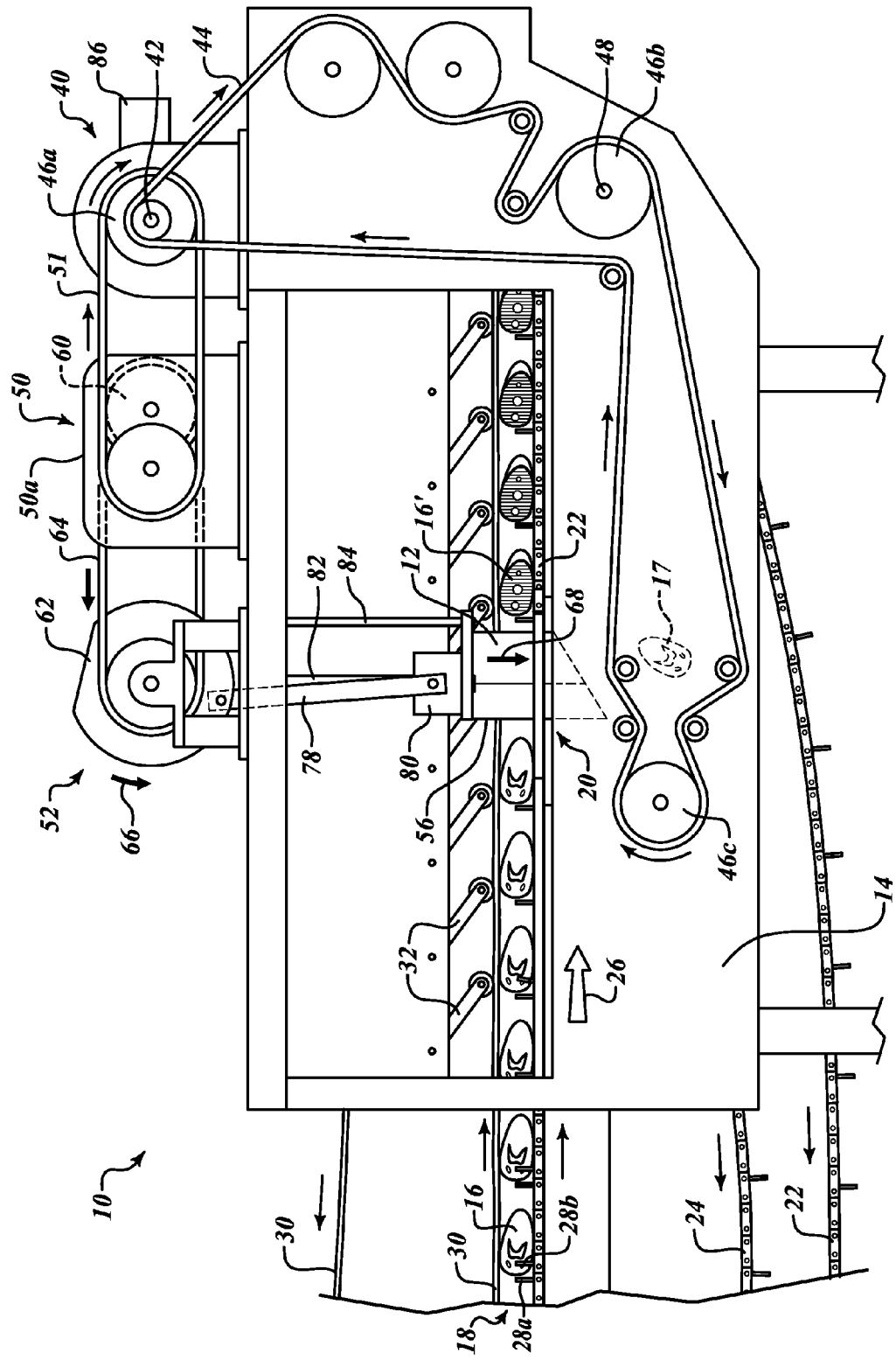
FIG. 1B is a side elevational view of the fish processing system of FIG. 1A showing the blade in a cutting position.
Figure 1C:
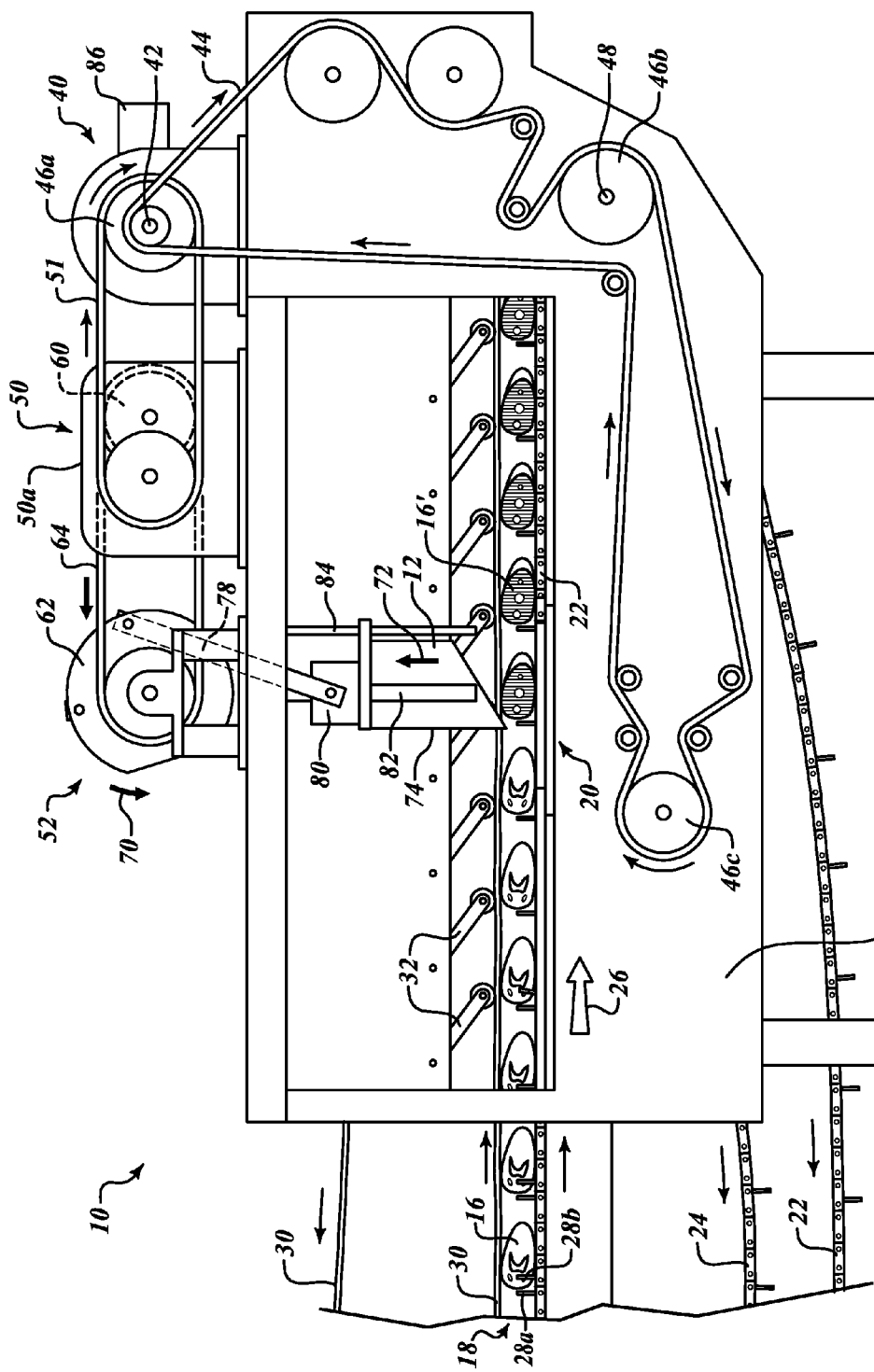
FIG. 1C is a side elevational view of the fish processing system of FIG. 1A showing the blade in a retracting position.

FIGS. 1A through 1C show a fish processing system 10 according to one example embodiment with a blade 12 thereof shown in different operational positions. The fish processing system 10 includes a structural frame 14 to support various conveying and processing elements in a relatively compact form factor. The frame 14 supports at least a portion of a conveyor system 18 which is configured to convey fish 16 received on a conveyor device thereof across a cutting location 20 during operation. The conveyor device of the conveyor system 18 may include, for example, belts, chains or movable beds for transporting the fish 16 across the cutting location 20. In the example embodiment shown in FIGS. 1A through 1C, for example, the conveyor device includes roller chains 22, 24 routed over a plurality of corresponding sprockets (not shown) which are arranged to carry fish 16 in a feed direction, as represented by the arrow labeled 26. Locating features 28a, 28b, such as, for example, upstanding pegs or other protrusions are coupled to the roller chains 22, 24 for positioning the fish 16 at regular intervals and in consistent positions for subsequent processing operations. Some of the locating features 28a are coupled to a primary roller chain 22 and are spaced to engage a first portion of each fish 16, such as, for example, the top of each fish 16. Other locating features 28b are coupled to a secondary roller chain 24 and spaced to engage a second portion of each fish 16, such as, for example, a head of each fish 16. The secondary roller chain 24 and corresponding locating features 28b may be configured to disengage the fish 16 prior to or upon reaching the cutting location 20 so as to not interfere with a cutting operation of the head of the fish 16 as described herein. Collectively, the roller chains 22, 24 and locating features 28a, 28b locate the fish 16 at generally regular and consistent intervals to be cut in a repeatable manner as the roller chains 22, 24 transport the fish 16 toward the cutting location 20.

The conveyor system 18 may further include a supplemental belt 30 and tension devices 32 to assist in transporting fish 16 across the cutting location 20. More particularly, a supplemental belt 30 may be provided to move in unison with the primary roller chain 22 with tension devices 32 biasing the supplemental belt 30 and fish 16 in a downward direction. This arrangement may ensure that the fish 16 remain firmly positioned for subsequent processing activities.

A conveyor drive motor 40, such as, for example, an electric rotary drive motor, is provided to drive the conveyor device (e.g., roller chains 22, 24) of the conveyor system 18. The conveyor drive motor 40 is attached to the structural frame 14 and includes a drive shaft 42 which is drivingly coupled to the conveyor device to cause the conveyor device to move via rotary motion thereof. The drive shaft 42 may be coupled to the conveyor device by various conventional power transmission components, such as, for example, a tractive element 44 in the form of a belt or chain and a plurality of sheaves, pulleys and/or sprockets 46a, 46b, 46c. For example, according to the fish processing system 10 shown in FIGS. 1A through 1C, a drive sprocket 46a may be coupled to the drive shaft 42 of the conveyor drive motor 40 and linked to a conveyor sprocket 46b via a tractive element 44 in the form of a roller chain. The conveyor sprocket 46b may be fixedly attached to a drive shaft or rod 48 and ultimately coupled to the primary roller chain 22 of the conveyor system 18 via one or more additional sprockets. In some embodiments, the conveyor sprocket 46b may also be linked to a supplemental conveyor sprocket 46c by the tractive element 44 for driving the supplemental roller chain 24 in a similar manner. The conveyor drive motor 40 is thus physically linked to the conveyor system 18 for transporting the fish 16 across the cutting location 20.

The fish processing system 10 further includes an intermittent drive mechanism 50 coupled between the drive shaft 42 of the conveyor drive motor 40 and a blade actuation device 52 to intermittingly move the blade 12 between a standby position 54, as shown in FIG. 1A, and a cutting position 56, as shown in FIG. 1B, to sequentially sever a head 17 or other portion from each of the fish 16 conveyed across the cutting location 20. The intermittent drive mechanism 50 may be, for example, a Geneva drive 50a or other gear mechanism coupled to the conveyor drive motor 40. As shown, the intermittent drive mechanism 50 may be coupled to the conveyor drive motor 40 by a tractive element 51 such that a continuous rotation arising from the conveyor drive motor 40 is converted into intermittent rotary motion of an output wheel 60 of the intermittent drive mechanism 50. The intermittent rotation of the output wheel 60 may then be used to drive the blade actuation device 52 between the standby position 54, as shown in FIG. 1A, and the cutting position 56, as shown in FIG. 1B. Consequently, movement of the blade actuation device 52 is physically coordinated with movement of the fish 16 through the cutting location 20.

As shown in FIGS. 1A through 1C, the blade actuation device 52 may include a blade drive wheel 62 which is drivingly coupled to the intermittent drive mechanism 50 by a tractive element 64 that rotates the blade drive wheel 62 intermittingly during a fish processing operation. In the position shown in FIG. 1A, for example, the output wheel 60 and hence blade drive wheel 62 is temporarily held stationary as fish 16 continue to move toward the cutting location 20. Then, as a fish 16 arrives at the cutting location 20, the output wheel 60 and hence blade drive wheel 62 is set into rotary motion by the intermittent drive mechanism 50 and the blade 12 plunges toward the cutting position 56 shown in FIG. 1B to sever the head 17 or other portion from the fish 16, as represented by the arrows labeled 66 and 68. As the output wheel 60 and blade drive wheel 62 continue to rotate, the blade 12 is subsequently retracted back toward the standby position 54 shown in FIG. 1A, as represented by the arrows labeled 70 and 72 in FIG. 1C. FIG. 1C shows the blade in an intermediate retracting position 74 between the cutting position 56 shown in FIG. 1B and the standby position 54 shown in FIG. 1A. Once the blade 12 returns to the standby position 54, the blade 12 is again temporarily held stationary while fish 16 continue to move in the feed direction 26 toward the cutting location 20.

To assist in moving the blade 12 between the standby position 54 and the cutting position 56, the blade 12 may be coupled to the blade drive wheel 62 via a linkage member 78. The linkage member 78 may be coupled between the blade drive wheel 62 and a blade base 80 which supports the blade 12 during the cutting operation. The blade base 80 may be supported during use to translate along one or more static guide features 82, 84 (e.g., guide rods, guide bars, etc.) to limit movement of the blade 12 to a linearly reciprocating path. For this purpose, the blade base 80 may include one or more respective apertures, grooves or other features to interact with corresponding static guide features 82, 84. The linkage member 78 forces the blade 12 downward during a first portion of the rotation of the blade drive wheel 62 and then draws or pulls the blade 12 upward during a latter portion of the rotation of the blade drive wheel 62 after the blade 12 reaches the extreme downward position and the head 17 or other portion of the fish 16 is severed. After the head 17 or other portion is severed, the headless or otherwise processed fish portion 16' continues forward for further processing or packaging and the severed fish head 17 or other fish portion is discarded or collected for other purposes.

A controller 86 may be electrically coupled to the conveyor drive motor 40 and configured to adjust a speed of the conveyor drive motor 40 as desired. Because the conveyor drive motor 40 is physically coupled to the conveyor system 18 and the blade actuation device 52 and drives motion of the same, a user may simultaneously regulate a rate at which fish 16 are transported across the cutting location 20 and a frequency at which the blade 12 moves from the standby position 54 to the cutting position 56. For example, an increase in the speed of rotation of the drive shaft 42 of the conveyor drive motor 40 results in a corresponding increase in the speed or rate at which fish 16 are fed across the cutting location 20 and the frequency at which the blade 12 reciprocates between the standby position 54 to the cutting position 56. It is appreciated that gearing may be selected to convert the rotational speed of the conveyor drive motor 40 to an appropriate fish transport speed and a corresponding frequency of blade 12 movement. Again, because the conveyor drive motor 40 is physically linked to the blade 12 and the conveyor device (e.g., roller chains 22, 24) of the conveyor system 18, timing between the components may be maintained with particularly high precision. This facilitates processing fish with high-quality and excellent consistency.

In accordance with the embodiments of the fish processing systems 10 described herein, related methods of processing fish are provided. For instance, in some embodiments, a method of processing fish may be provided which includes transporting fish 16 sequentially through a cutting location 20 with a conveyor system 18 driven by continuous rotation of a drive shaft 42 of a conveyor drive motor 40. The method may further include converting the continuous rotation of the drive shaft 42 of the conveyor drive motor 40 to intermittent movement of a blade 12 to reciprocate the blade 12 between a standby position 54 and a cutting position 56 to sever a head 17 or other portion of the fish 16. The intermittent movement of the blade 12 may be coordinated to correspond to the arrival of each fish 16 in a series of the fish 16 at the cutting location 20.

The method may further include simultaneously adjusting a rate at which the fish 16 are transported along the transport path and a frequency at which the blade 12 moves from the standby position 54 to the cutting position 56. In this manner, a user may advantageously adjust a fish processing rate without separately needing to adjust the timing of the reciprocating blade 12. The movement of the blade 12 is physically linked to the conveyor system 18 to ensure that the movement of the blade 12 is precisely timed and controlled to correspond to the arrival of a fish 16 at the cutting location 20. Accordingly, particularly consistent results may be achieved.

The method may further include guiding the blade to reciprocate linearly between the standby position 54 and the cutting position 56. Static guide features 82, 84 may be provided to facilitate such linear movement of the blade 12. In other embodiments, the blade 12 may be reciprocated in an arcuate or other curvilinear path. Irrespective of the particular path, the blade 12 is configured to move such that a leading edge thereof traverses across the entire cross-sectional profile of the fish 16 so that the head 17 or other portion of the fish 16 is completely severed from the remaining portions of the fish 16'.

The method of processing fish may further include driving the blade 12 between the standby position 54 and the cutting position 56 with a linkage member 78 coupled between the blade 12 and a blade drive wheel 62 which is itself coupled to the drive shaft 42 of the conveyor drive motor 40 by an intermittent drive mechanism 50, such as, for example, a Geneva drive. The intermittent drive mechanism 50 may be coupled to the blade drive wheel 62 by a tractive element 64, the tractive element 64 intermittingly rotating the blade drive wheel 62 to reciprocate the blade 12 via the intermediary of at least the linkage member 78. Again, the physical link between the blade 12 and the conveyor system 18 ensures that movement of the blade 12 is precisely timed and coordinated to correspond to the arrival of fish 16 at the cutting location 20.

Although the fish processing systems 10 and related methods described herein are directed in particular to severing the head 17 of a fish 16, it is appreciated that aspects of the systems 10 and methods may be applied to the removal of other portions of the fish 16 or other fish processing activities. In addition, it is appreciated that aspects of the systems 10 and methods may be applicable to processing products other than fish 16, such as, for example, other food products which require cutting or severing operations.

Furthermore, the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A fish processing system, comprising:
   a structural frame;
   a conveyor device coupled to the structural frame to convey fish received on the conveyor device across a cutting location;
   a conveyor drive motor coupled to the structural frame and having a drive shaft coupled to the conveyor device to cause the conveyor device to move via continuous rotation of the drive shaft;
   a blade movably coupled to the structural frame to move across a transport path of the fish conveyed by the conveyor device; and
   an intermittent drive mechanism coupled to the drive shaft of the conveyor drive motor and drivingly coupled to the blade to convert continuous rotation of the drive shaft to intermittent movement of the blade between a standby position and a cutting position to sequentially sever a portion from each of a series of the fish conveyed across the cutting location during a fish processing operation.

2. The fish processing system of claim 1, further comprising:
   a blade drive wheel; and
   a tractive element, the intermittent drive mechanism drivingly coupled to the blade drive wheel by the tractive element to rotate the blade drive wheel intermittently during the fish processing operation.

3. The fish processing system of claim 2, further comprising:
   a linkage member coupled to the blade and driven by the blade drive wheel to move the blade in a reciprocating manner between the standby position and the cutting position; and
   blade guide members positioned to ensure linear movement of the blade when the blade reciprocates between the standby position and the cutting position.

4. A fish processing apparatus, comprising:
   a conveyor device;
   a conveyor drive motor coupled to the conveyor device to cause fish received by the conveyor device to be transported along a transport path;
   a blade movable across the transport path; and
   an intermittent drive mechanism coupled to the conveyor drive motor and coupled to the blade to convert continuous movement produced by the conveyor drive motor to intermittent movement of the blade between a standby position and a cutting position.

5. The fish processing apparatus of claim 4 wherein the intermittent drive mechanism includes a Geneva drive.

6. The fish processing apparatus of claim 4, further comprising:
   a linkage member coupled to the blade and driven by the intermittent drive mechanism to move the blade in a reciprocating manner between the standby position and the cutting position.

7. The fish processing apparatus of claim 4, further comprising:
   a blade drive wheel; and
   a tractive element, the intermittent drive mechanism drivingly coupled to the blade drive wheel by the tractive element to rotate the blade drive wheel intermittently when processing the fish.

8. The fish processing apparatus of claim 4, further comprising:
   blade guide members positioned to ensure linear movement of the blade when the blade reciprocates between the standby position and the cutting position.

9. The fish processing apparatus of claim 4, further comprising:
   a controller configured to adjust a speed of the conveyor drive motor to simultaneously regulate a rate at which the fish are transported along the transport path and a frequency at which the blade moves from the standby position to the cutting position.

10. The fish processing apparatus of claim 4 wherein movement of the blade and movement of the conveyor device are controlled simultaneously via the conveyor drive motor, the conveyor drive motor physically linked to each of the blade and the conveyor device by at least one respective tractive element.

11. A method of processing fish, the method comprising:
    transporting fish through a cutting location with a conveyor device driven by continuous rotation of a drive shaft of a conveyor motor; and
    converting the continuous rotation of the drive shaft of the conveyor motor to intermittent movement of a blade to reciprocate the blade between a standby position and a cutting position.

12. The method of processing fish of claim 11, further comprising:
    coordinating the intermittent movement of the blade to correspond to the arrival at the cutting location of each fish in a series of the fish.

13. The method of processing fish of claim 11, further comprising:
    simultaneously adjusting a rate at which the fish are transported along the transport path and a frequency at which the blade moves from the standby position to the cutting position.

14. The method of processing fish of claim 11, further comprising:
    guiding the blade to reciprocate linearly between the standby position and the cutting position.

15. The method of processing fish of claim 11, further comprising:
    driving the blade between the standby position and the cutting position with a linkage member coupled between the blade and a blade drive wheel, the blade drive wheel coupled to the drive shaft of the conveyor motor by an intermittent drive mechanism.

16. The method of processing fish of claim 11, further comprising:
    sequentially severing a head from each of a series of the fish transported through the cutting location.

17. The method of processing fish of claim 11 wherein converting the continuous rotation of the drive shaft of the conveyor motor to intermittent movement of the blade includes intermittingly rotating a blade drive wheel via an intermittent drive mechanism coupled between the blade drive wheel and the conveyor motor.

18. The method of processing fish of claim 11, further comprising:
    routing the fish to another location downstream of the cutting location for subsequent processing or packaging.

* * * * *